US012030469B2

(12) United States Patent
O'Meachair et al.

(10) Patent No.: US 12,030,469 B2
(45) Date of Patent: Jul. 9, 2024

(54) REGENERATIVE BRAKING SYSTEM

(71) Applicant: BENTLEY MOTORS LIMITED, Crewe (GB)

(72) Inventors: Deaglan O'Meachair, Nantwich (GB); Matthew Crumpton, Nantwich (GB)

(73) Assignee: Bentley Motors Limited, Crewe (GB)

( * ) Notice: Subject to any disclaimer, the term of this patent is extended or adjusted under 35 U.S.C. 154(b) by 612 days.

(21) Appl. No.: 16/483,735

(22) PCT Filed: Jan. 19, 2018

(86) PCT No.: PCT/GB2018/050166
§ 371 (c)(1),
(2) Date: Aug. 5, 2019

(87) PCT Pub. No.: WO2018/142104
PCT Pub. Date: Aug. 9, 2018

(65) Prior Publication Data
US 2020/0023817 A1 Jan. 23, 2020

(30) Foreign Application Priority Data

Feb. 3, 2017 (GB) .................................... 1701786

(51) Int. Cl.
*B60T 1/10* (2006.01)
*G07C 5/08* (2006.01)
*G09B 19/16* (2006.01)

(52) U.S. Cl.
CPC .............. *B60T 1/10* (2013.01); *G07C 5/0816* (2013.01); *G09B 19/167* (2013.01);
(Continued)

(58) Field of Classification Search
None
See application file for complete search history.

(56) References Cited

U.S. PATENT DOCUMENTS

2008/0042489 A1* 2/2008 Lewis ..................... B60T 1/10
  303/152
2012/0175200 A1* 7/2012 Sagan ................. B60W 10/188
  701/70
(Continued)

FOREIGN PATENT DOCUMENTS

CN 102267458 A 12/2011
CN 104113903 A 10/2014
(Continued)

OTHER PUBLICATIONS

Chinese Patent Application No. 201880010247.8; English translation of Office Action dated Aug. 29, 2022.

*Primary Examiner* — Todd Melton
*Assistant Examiner* — Jason R Roberson
(74) *Attorney, Agent, or Firm* — Schwabe Williamson & Wyatt, P.C.

(57) ABSTRACT

A regenerative braking system for a vehicle includes a means 13 for storing details of one or more deceleration profiles for the vehicle; means for comparing 13, arranged to compare a current braking manoeuvre with the or a selected stored deceleration profile which generates an output signal, during the manoeuvre, representative of any deviation of the deceleration profile of the current braking manoeuvre from the ideal deceleration profile with which it is compared. This output can be used to drive a display 14 to provide feedback to a driver as to the efficiency of a braking manoeuvre. Multiple ideal deceleration profiles may be stored and the system arranged to compare a current braking manoeuvre with the most relevant stored profile. Profiles may be stored in association with spatial, temporal and/or environmental information.

18 Claims, 4 Drawing Sheets

(52) U.S. Cl.
    CPC ....... *B60L 2250/16* (2013.01); *B60L 2250/18* (2013.01); *B60T 2220/02* (2013.01); *B60W 2540/30* (2013.01)

(56) References Cited

U.S. PATENT DOCUMENTS

| | | |
|---|---|---|
| 2012/0179346 A1 | 7/2012 | Aldighieri |
| 2013/0296130 A1* | 11/2013 | Banker .................... B60L 7/26 477/209 |
| 2015/0084760 A1 | 3/2015 | Lee |
| 2015/0151638 A1* | 6/2015 | Tagawa ............... B60L 15/2009 180/65.265 |
| 2016/0267726 A1* | 9/2016 | Soo .......................... G07C 5/08 |

FOREIGN PATENT DOCUMENTS

| | | |
|---|---|---|
| DE | 102016102822 A1 | 8/2016 |
| EP | 2623380 A1 | 8/2013 |
| JP | 2007221889 A | 8/2007 |
| JP | 2009177956 A | 8/2009 |
| JP | 2011167008 | 8/2011 |
| WO | WO2011/143165 A1 | 11/2011 |

\* cited by examiner

REGENERATIVE BRAKING SYSTEM

CROSS-REFERENCE TO RELATED APPLICATION

This application is a 371 U.S. National Stage of International Application No. PCT/GB2018/050166, filed Jan. 19, 2018, entitled "REGENERATIVE BRAKING SYSTEM," which designated, among the various States, the United States of America, and which claims priority to GB 1701786.4, filed Feb. 3, 2017, both of which are hereby incorporated by reference.

TECHNICAL FIELD OF THE INVENTION

The present invention relates to a braking system for a vehicle, and particularly but not exclusively to a regenerative braking system for a vehicle such as an automobile.

BACKGROUND TO THE INVENTION

Automobiles with an electric propulsion system, such as those with a hybrid drive system comprising an internal combustion engine, an electric traction motor and an electric battery, as well as pure electric vehicles, typically deploy regenerative braking in order to recover and store the vehicle's kinetic energy for use in propelling the vehicle. This is achieved by using an electric traction motor in reverse, as a generator, to convert rotational kinetic energy from the vehicle's road wheels to electrical energy which is stored in an electrical battery on the vehicle.

Owing to the capacity of typical electrical traction motors and other characteristics of electrical traction systems these regenerative braking systems cannot absorb energy as rapidly as it can be dissipated by a conventional friction braking system, and their ability to absorb energy can vary with operating and environmental conditions such as vehicle speed. Consequently a friction braking system is also provided, to supplement and provide a back up to the regenerative system, and a brake control system is provided to distribute braking effort between the friction and regenerative systems. The brake control system is arranged to distribute braking effort between the two braking systems to maximise energy recovery, whilst maintaining the feel of a conventional friction braking system to the driver.

In practice the amount of energy that is recovered by regenerative braking systems is limited by a driver's driving style. Heavy braking usually requires both regenerative and friction brakes to operate. Whenever the friction brakes are deployed energy is dispersed that might otherwise be recovered. To maximise energy recovery it is necessary for a driver to modify their driving and, in particular, braking style to suit a particular vehicle. However, it is not always apparent to a driver how they should modify their braking style, especially where a regenerative braking system is designed to provide the same feel as a conventional friction braking system. Further, the optimal braking strategy may vary depending on external factors such as road and traffic conditions as well as varying from vehicle to vehicle.

It is an object of embodiments of the present invention address these problems.

SUMMARY OF THE INVENTION

According to an aspect of the invention there is provided a regenerative braking system for a vehicle comprising: a means for storing details of one or more deceleration profiles for the vehicle; and a means for comparing, arranged to compare a current braking manoeuvre with the or a selected stored deceleration profile and generate an output signal, during the manoeuvre, representative of any deviation of the deceleration profile of the current braking manoeuvre from the stored deceleration profile with which it is compared.

Thus, the output signal is useful for providing feedback to a driver indicative of how much a braking manoeuvre deviates from a stored deceleration profile, which may be a preferred or ideal deceleration profile for the vehicle.

The regenerative braking system may comprise a driver interface driven by the output signal in order to provide feedback to a driver of the vehicle on the current braking manoeuvre. The interface may be a display, or may provide audible, haptic or other feedback to a driver. The interface may indicate if the driver's braking effort is lower or higher than that required to achieve the stored deceleration profile, and may indicate the extent of deviation from the effort required to achieve the stored deceleration profile. This thus enables a driver to alter their behaviour, in particular braking effort, during a braking manoeuvre so that it more closely corresponds to a stored and in particular an ideal deceleration profile.

The regenerative braking system may comprise means for storing the deceleration profile of the current braking manoeuvre. The means for comparing may be arranged, on completion of a braking manoeuvre, to determine a merit score for the deceleration profile of the current manoeuvre and to compare this with the merit score of the stored braking profile with which the current braking profile was compared during the braking manoeuvre. The merit score may be, or relate to, the amount of energy recovered during the braking manoeuvre. The means for comparing may be arranged to replace details of the deceleration profile of the stored deceleration profile with details of the deceleration profile of the current braking manoeuvre when the merit score of the deceleration profile of the current braking manoeuvre exceeds that of the deceleration profile of the stored braking manoeuvre, thus replacing the stored deceleration profile. Thus, the system effectively learns the profile of an ideal braking manoeuvre through use. As such an ideal deceleration profile is the currently known profile which achieves the greatest energy recovery.

The regenerative braking system may comprise a regenerative brake controller arranged to provide information about braking events to the means for comparing. The information may include one or more of the following:
vehicle speed;
the duration of brake application:
the demanded braking effort;
braking effort provided by the regenerative braking system; and
energy recovered by the regenerative braking system.

The regenerative braking system may comprise a positioning system operative to determine the location of the vehicle, and provide this to the means for comparing. The positioning system may comprise a memory storing map data and may be arranged to provide information relating to characteristics of the road at the vehicle's location to the means for comparing. The means for comparing may comprise a clock enabling the time of day and/or day of the week of a braking manoeuvre to be determined.

The regenerative braking system may comprise a thermometer operative to measure the ambient temperature outside the vehicle and provide it to the means for comparing.

The regenerative braking system may comprise a sensor operative to provide information relating to the distance travelled by the vehicle to the means for comparing.

The regenerative braking system may be arranged to store the following details of deceleration profiles:
- distance travelled per unit time;
- demanded braking effort; and
- energy recovered.

The regenerative braking system may also be arranged to store one or more of the following details of deceleration profiles:
- location;
- time of day;
- day of the week;
- characteristics of the road; and/or
- temperature.

The means for storing may store details of two or more deceleration profiles and the means for comparing may be arranged, when a brake application is initially made, to select one of the stored deceleration profiles against which to compare the current braking manoeuvre. This enables different ideal deceleration profiles to be stored, intended to be used in different situations and for the most appropriate profile to be selected for a given situation.

To this end, the means for comparing may be arranged to compare spatial, temporal and/or environmental information stored in relation to stored deceleration profiles with the corresponding information pertaining to the current braking manoeuvre and to select the stored deceleration profile for which the stored temporal and/or environmental information most closely matches that of the current braking manoeuvre.

The means for storing may store details of a default deceleration profile and details of one or more additional deceleration profiles and the details of the additional deceleration profiles include spatial, temporal and/or environmental information.

The means for comparing may be arranged to compare the spatial, temporal and/or environmental information stored in relation to the additional stored deceleration profiles with the corresponding information pertaining to the current braking manoeuvre and select any profiles with which a valid comparison can be made and, in default of any profiles being selected, to compare the current braking manoeuvre with the default deceleration profile.

When more than one stored deceleration profile with which a valid comparison can be made is selected the means for comparing may be arranged to generate a similarity score representing the degree of similarity between the spatial, temporal and/or environmental information of the current braking manoeuvre and that of each of the ideal deceleration profiles.

The means for comparing may be arranged to select the deceleration profile with the highest similarity score to compare with the current braking manoeuvre, provided that the similarity score exceeds a threshold value, and otherwise to compare it with the default deceleration profile.

When the current braking manoeuvre is compared with the default deceleration profile, the means for comparing may be arranged to store details of the deceleration profile of the current braking manoeuvre as an additional stored deceleration profile. Thus a new stored deceleration profile is stored for conditions for which there was previously no stored deceleration profile pertaining to sufficiently valid conditions to make a valid comparison with the current braking manoeuvre. This increases the library of stored braking manoeuvres with which a comparison can be made.

DETAILED DESCRIPTION OF THE INVENTION

In order that the invention may be more clearly understood embodiments thereof will now be described, by way of example only, with reference to the accompanying drawings, of which:

Figure 1:
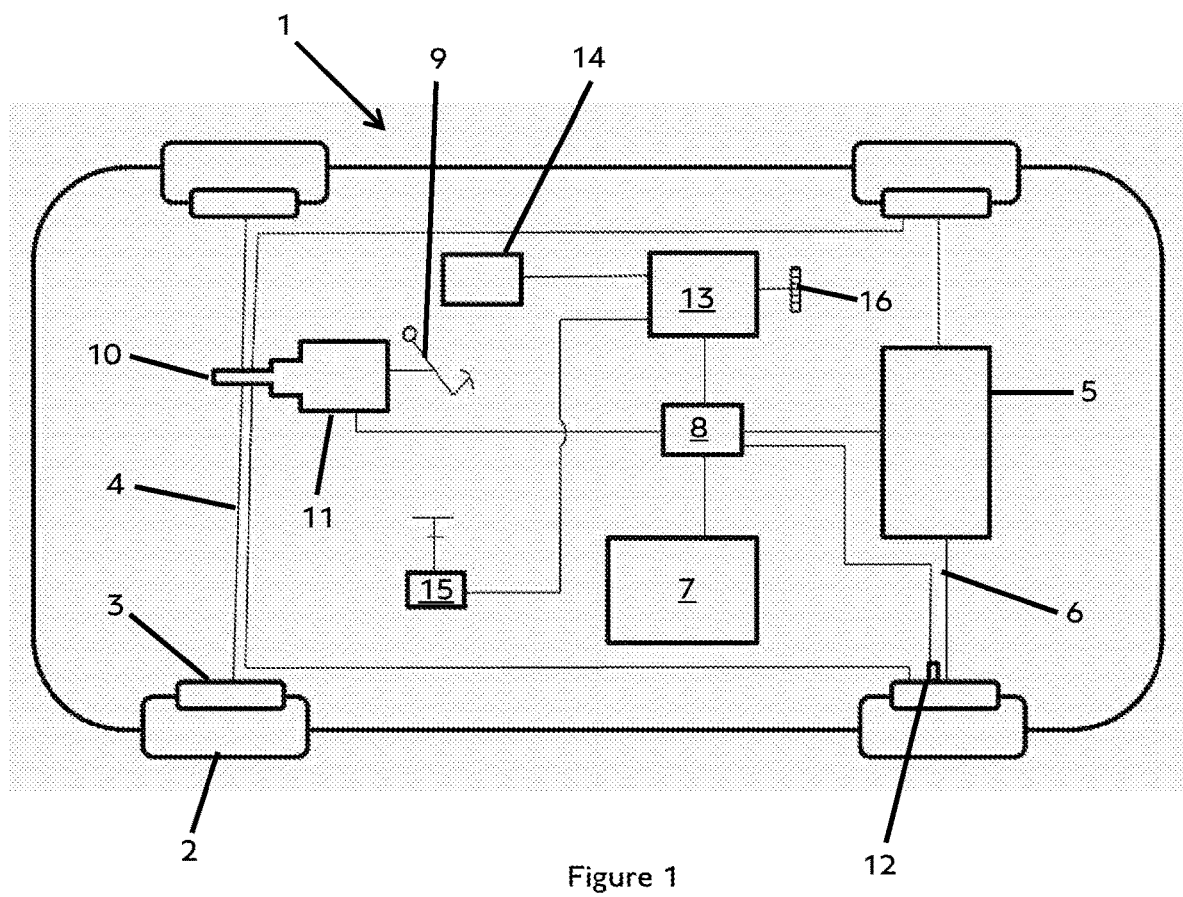
FIG. 1 is a schematic view of an automobile showing components of its braking system.

Referring to FIG. 1, an automobile 1 is provided with four road wheels 2. The automobile is provided with friction and regenerative braking systems.

The friction braking system comprises a respective disc brake 3 associated with each road wheel 2. The disc brakes each comprise a hydraulically operated calliper connected via a brake pipe 4 to a master cylinder 10.

The regenerative braking system comprises an electric motor 5 drivingly connected to the rear wheels of the automobile by shafts 6. The motor 5 is connected to an electric battery 7 by a regenerative brake controller 8. The regenerative brake controller causes the motor to operate as a generator, absorbing rotational energy from the rear wheels of the automobile and generating electricity which is fed to the battery 7 where it is stored, when a driver demands braking effort. The regenerative brake controller 8 is connected to a wheel (or axle) sensor 12 which measures the rate of rotation of a road wheel so as to determine the speed of the vehicle and its rate of deceleration.

The braking system is operated by a brake pedal 9 which a driver of the automobile presses against a support force to demand a braking effort from the braking system. The brake pedal 9 is connected to the master cylinder 10 via an electromechanical brake booster 11. The electromechanical brake booster 11 comprises a sensor to determine brake pedal position, and servo to operate or assist operation of the master cylinder 10 and is connected to the brake regenerative brake controller 8.

In use, on a brake application, brake pedal position, as measured by the brake pedal position sensor of the regenerative brake controller 8, is transmitted to the regenerative brake controller, as is the speed of the vehicle as determined by the wheel sensor 12. The regenerative brake controller 8 is arranged to provide the demanded braking effort by deploying the regenerative and/or friction brakes in a manner which provides the driver with a similar response to a friction only braking system, whilst maximising energy recovery.

In practice the regenerative brake controller 8 uses available regenerative braking effort in preference to the use of friction brakes except where the vehicle is travelling below a threshold minimum speed (for example 10 km/h) where braking is provided only by the friction brakes in order to provide a more refined deceleration. Braking effort provided by the regenerative braking system is controlled directly by the regenerative brake controller. Braking effort provided by the friction braking system is determined by the electromechanical brake booster under control of the regenerative brake controller.

Combined friction and regenerative braking systems of this type are known, and deployed on pure electric and so called hybrid automobiles comprising an internal combustion engine and second drive arrangement powered by a rechargeable source of stored energy, typically an electric motor and battery or capacitor. The manner in which the braking system is implemented is not critical to the invention.

Where the braking system differs to conventional systems is in the provision of a brake optimisation processor (BOP) 13 which is operatively connected to the regenerative brake controller 8, a dashboard display 14, positioning system 15 and thermometer 16.

The BOP 13 comprises a processor, which may be programmable, and a memory. The BOP 13 may be implemented on an existing processor or electronic control unit of an automobile or it may be provided as a standalone unit. The BOP receives information from the regenerative brake controller relating to braking events, including:

vehicle speed;
distance travelled per unit time throughout the manoeuvre;
the duration of braking application (braking time):
the demanded braking effort;
brake fluid pressure of the friction braking system;
braking effort provided by the regenerative braking system; and
energy recovered by the regenerative braking system.

The navigation system 15 comprises a positioning system operative to determine the location of the automobile (such as a global positioning system), and stored map data containing information as to the characteristics of roads at certain locations. This may include the class of road, local gradient and radius of curves in the road. The BOP 13 receives location information and selected map data relating to the current automobile location from the navigation system.

The thermometer 16 measures the ambient temperature outside the vehicle and provides this to the BOP 13.

Figure 2:
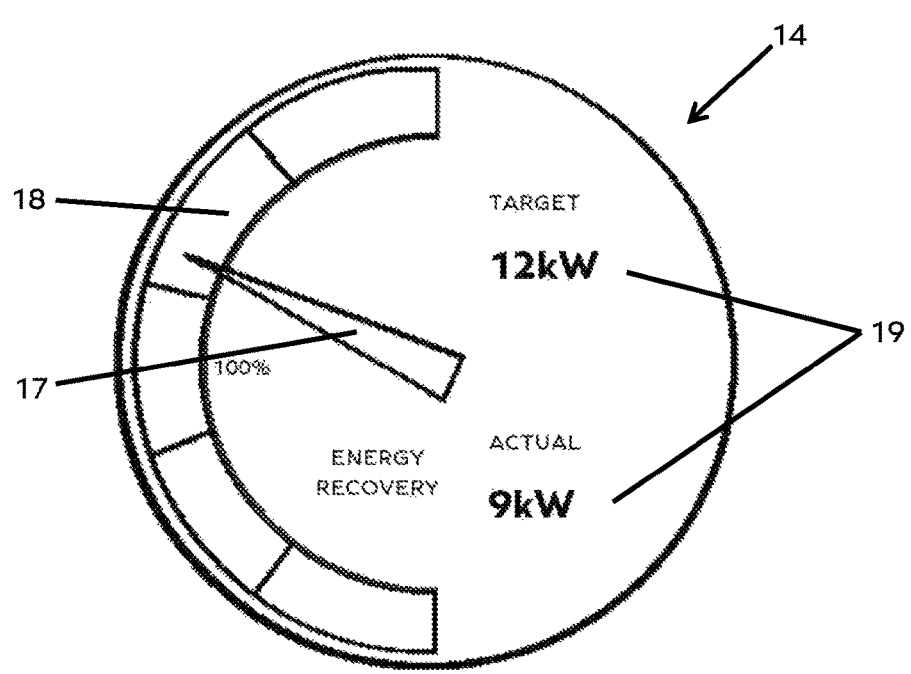
FIG. 2 shows a dashboard display of the automobile of FIG. 1.

The dashboard display 14 is illustrated in FIG. 2. It comprises a rotatably mounted pointer 17 the tip of which moves against a scale 17 divided into five segments. The central segment extends over about 36 degrees is labelled 100% and coloured a first colour (for example green) and positioned so that the needle points to the centre of the segment when it is aligned approximately horizontally. Positioned above and below the central segment are second segments each extending over about 36 degrees and coloured a second colour (for example orange). Positioned above and below the second segments are third segments each extending over about 36 degrees and coloured a third colour (for example red). The region above the central segment represents "HIGH EFFORT" and the region below the central segment represents "LOW EFFORT". The display could be implemented by a mechanical needle moved by an actuator against a background, or by a display screen showing an image of the display.

The display 14 also comprises two digital displays 19, one labelled "TARGET" and the other "ACTUAL". These could be dedicated digital displays or an image shown on a display screen.

The BOP 13 causes the pointer to rest pointing towards the centre of the scale, the 100% zone. When a driver presses the brake pedal 9 the BOP causes the needle to move upwards towards the HIGH EFFORT end of the scale if the demanded braking effort exceeds that which will obtain optimum energy recovery, and towards the LOW EFFORT end of the scale if the demanded braking effort is less than that which will obtain optimum energy recovery. This provides feedback to a driver of the automobile as to how they can modify their braking behaviour to improve energy recovery. When the brake pedal is released or the automobile comes to rest the BOP causes the needle to return to point at the centre of the scale.

When a driver presses the brake pedal the BOP also causes the digital displays to display a target value for the optimum rate of energy recovery for the braking manoeuvre, together with the actual rate of energy being recovered during the manoeuvre, both in kW. This also provides information to the driver that enables the driver to modify their behaviour to improve the efficiency of the braking manoeuvre. At the end of a braking manoeuvre, being either when the automobile comes to rest or the driver releases the brake pedal, the BOP causes the digital displays to become blank.

Operation of the BOP 13 in order to obtain information to drive the dashboard display 14 will now be described in more detail.

The different modes of operation described can be regarded as different embodiments of the invention. The different modes may, however, be combined in any combination in a single embodiment.

Figure 3:
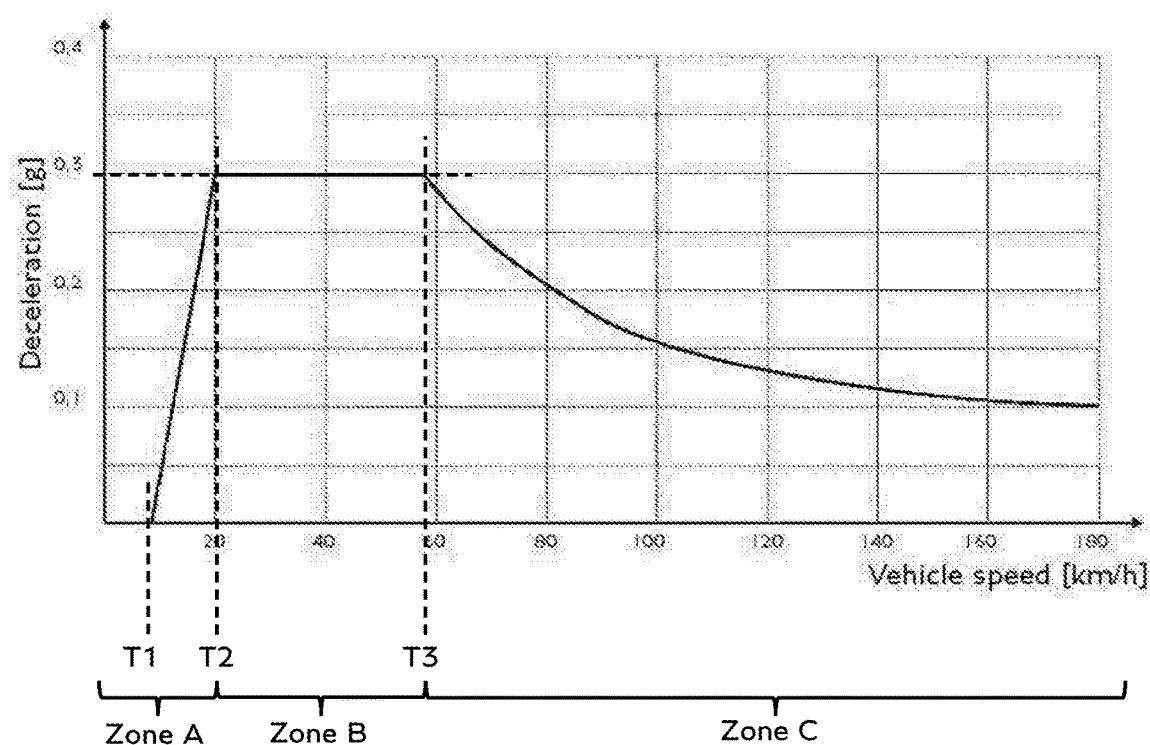
FIG. 3 is a graph of deceleration provided by the regenerative braking system against vehicle speed for the automobile of FIG. 1.

FIG. 3 is a graph showing the rate of deceleration in g that can be effected by braking effort proved only by the regenerative braking system of the automobile of FIG. 1 at various vehicle speeds. The figures are specific to a particular vehicle, but the shape of the graph is common to most automobile regenerative braking systems.

For speeds below a first threshold T1 (10 km/h in the example) the braking system does not deploy the regenerative brakes, in order to provide a smooth deceleration.

At speeds from the first threshold to a second threshold T2 (20 km/h in the example) the available deceleration increases substantially linearly with speed to a maximum value (0.3 g in the example). This increase is determined by the regenerative brake controller, also to provide for a smooth deceleration at these relatively low speeds.

The maximum deceleration value is that which can be achieved by the regenerative braking system. It is limited by the maximum torque that can be delivered by the electric motor 5.

For speeds between the second threshold and a third threshold T3 (58 km/h in the example) the available deceleration is constant since it remains limited by the maximum available motor torque.

For speeds above the third threshold available deceleration decreases with increasing vehicle speed, in a non-linear fashion. For speeds above the third threshold the deceleration that can be achieved is limited by the maximum power that can be absorbed by the electric motor 5.

The area under the line in the graph represents an energy recovery zone. Braking manoeuvers falling within this zone are achieved by using the regenerative braking system and so result in better energy recovery than those falling outside the zone. Outside the zone the friction brakes are deployed, solely in the case of speeds below the first threshold T1 and together with the regenerative brakes for speeds above the first threshold T1. Deploying the friction brakes wastes energy that might otherwise be recovered and so reduces efficiency of a braking manoeuvre.

For convenience, braking manoeuvres can be divided in up to three zones, zone A being at speeds up to the second threshold where the proportion of regenerative braking deployed is limited by the regenerative brake controller, zone B being braking at speeds between the second and third thresholds where the amount of regenerative braking available is limited by the motor torque and zone C being braking from speeds at or above the third threshold where the amount of regenerative braking is limited by motor power.

For braking manoeuvres within the energy recovery zone the efficiency of the manoeuvre may still be influenced by the amount of braking effort used. The efficiency of the regenerative braking system in returning energy to the battery 7 tends to improve towards application of maximum braking torque by the motor. In longer braking manoeuvres taking place over a range of speeds which extends between at least two of the zones A, B and C greater utilisation of braking torque in one zone may lead to a reduced need for friction braking in another zone.

Figure 4:
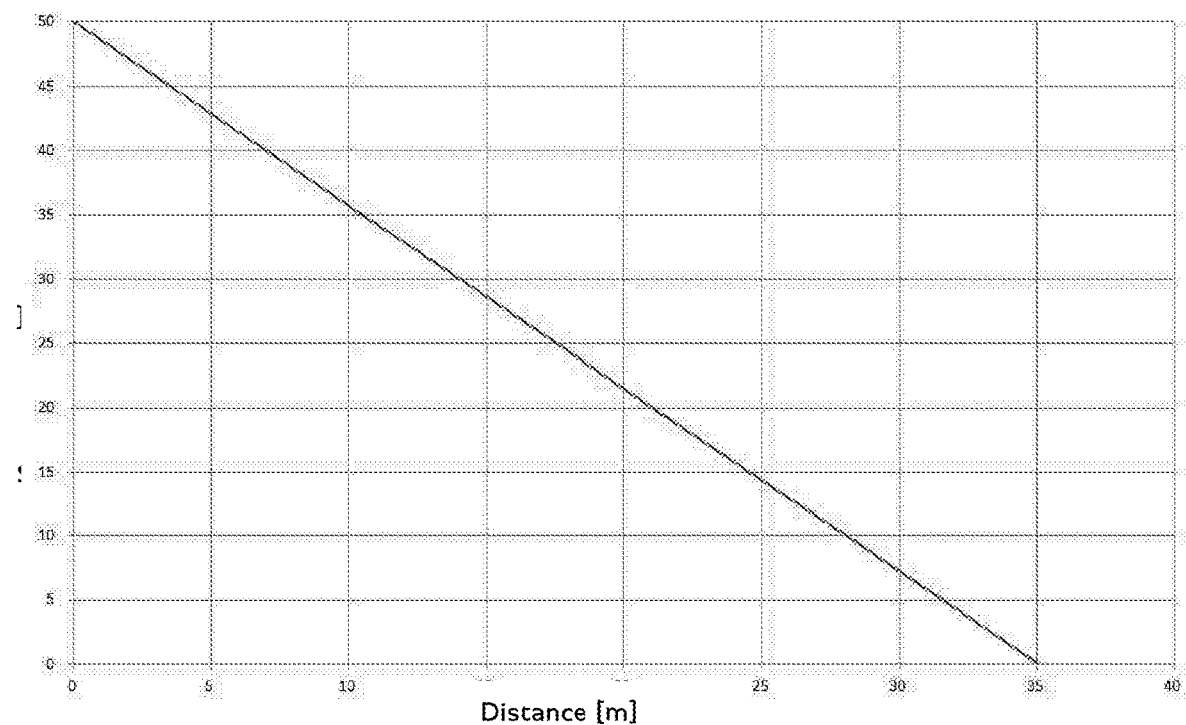
FIGS. 4-7 are graphs of speed against distance for the automobile of FIG. 1.
Figure 5:
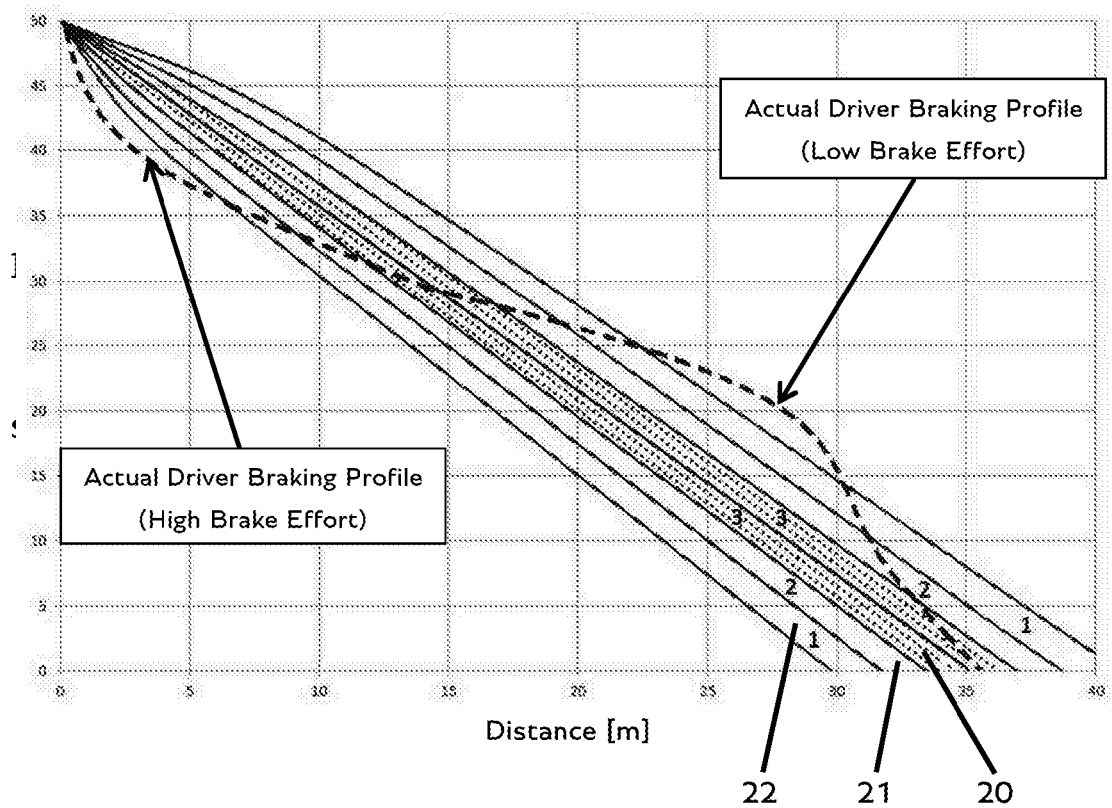
Figure 6:
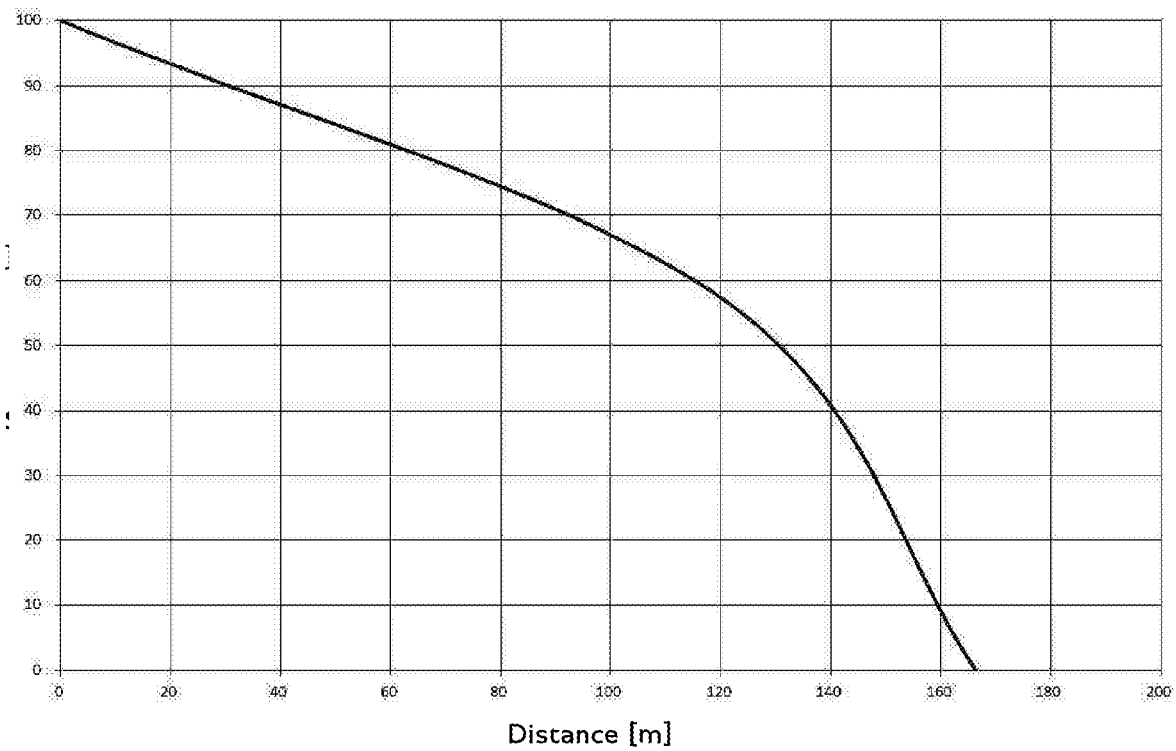

FIGS. 4 to 6 show one way in which the efficiency of a braking manoeuvre can be measured. FIG. 4 is a graph of speed against distance showing the deceleration profile from a speed of 50 km/h to rest which achieves maximum energy recovery. This is achieved by using only the regenerative braking system to provide the maximum available braking torque from 50 km/h to 20 km/h after which the regenerative brake controller deploys the friction braking system to maintain the same rate of deceleration of the vehicle whilst reducing torque from the motor below 20 km/h.

Deviating from this deceleration profile results in a reduction in the amount of energy recovered in the manoeuvre. FIG. 5 shows an actual braking profile (in a broken line) together with the ideal linear profile of FIG. 4 in a solid line. In the example actual profile the driver initially demands more braking effort than the regenerative braking system can provide (thus using the friction brakes) and subsequently demands less braking effort than the regenerating system can provide (reducing the efficiency with which energy is recovered). Whilst the automobile is brought to rest in about the same distance as the ideal deceleration profile, the energy recovered is reduced.

FIG. 5 also shows three regions 20, 21 and 22 either side of and bounding the ideal deceleration profile. The first region 20 lies adjacent the ideal profile. The second region 21 lies adjacent and defines the edge of the first region and the third region 22 lies adjacent and defines the edge of the second region. The three regions extend over the length of the ideal deceleration profile and increase in width from a zero width at the beginning of the profile to its end, initially increasing in width more sharply and then more narrowly from the higher to lower speed ends of the profile.

Figure 7:
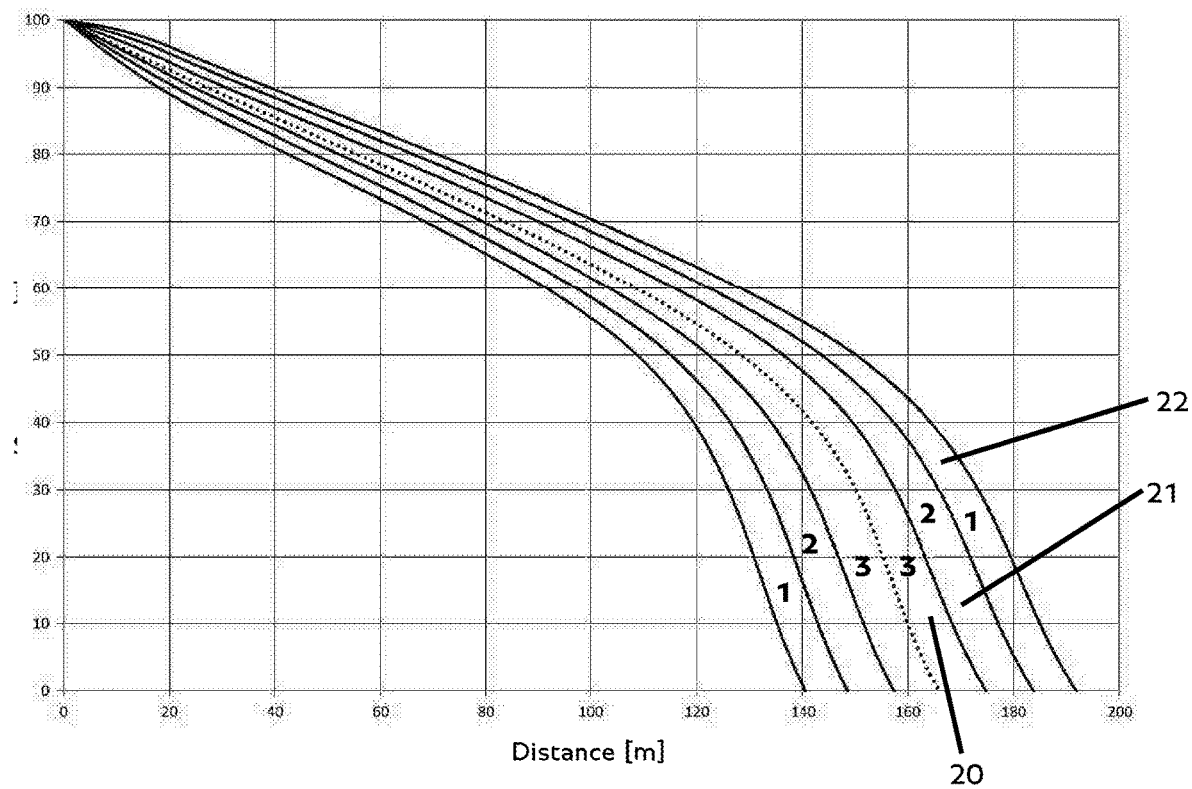

FIGS. 6 and 7 show similar graphs to FIGS. 4 and 5, but with the ideal deceleration profile extended to begin at 100 km/h. Again the profile is such that only regenerative braking is employed at speeds above 20 km/h. As such, the rate of deceleration above 50 km/h, where motor power limits the braking torque the motor can provide, is lower than that below 50 km/h. FIG. 7 also includes regions 20, 21 and 22 either side of the ideal profile.

The distance that an actual deceleration profile deviates from the ideal profile on the graph may be used to indicate how much the efficiency of the manoeuvre deviates from optimum efficiency. The distance is used to drive the pointer 17 of the dashboard display.

In one embodiment the BOP comprises a means for storing, such as an electronic memory, which stores details of an ideal deceleration profile for the automobile, that which achieves maximum (or good) energy recovery. At any time, the stored ideal deceleration profile may be the known profile which achieves the greatest energy recovery. This could be stored as a formula or look up table. The stored details comprise distance travelled per unit time, or equivalent data such as vehicle speed over time, to define the profile as well as the amount of energy which is recovered when the vehicle is braked according to the ideal deceleration profile. This may include the amount of energy recovered at each stage of the profile so that an actual braking manoeuvre which takes places between two speeds lying with a range of speeds covered by the ideal profile can be compared with the ideal profile. The information stored enables the BOP to determine ideal vehicle speed when the vehicle has travelled a given distance in a braking manoeuvre from a given start speed, and thus to provide feedback to the driver as to the efficiency of the braking manoeuvre. It also enables the BOP to determine how the efficiency of a braking manoeuvre performed by a driver compares to that of the stored ideal deceleration profile. Thus the BOP acts a means for comparing a current braking manoeuvre against a stored deceleration profile.

When a driver applies the brakes the BOP determines the speed of the automobile (the Start Speed) from the output of the wheel sensor 12, via the regenerative brake controller 8. It also begins to measure the distance travelled by the automobile, also from the output of the wheel sensor. At time intervals the distance travelled from the point of brake application is cross-referenced to the ideal deceleration profile to determine what speed the automobile would be travelling at if it had followed the ideal deceleration profile from the Start Speed over the distance travelled. The BOP then calculates the difference between the actual speed and the theoretical speed at the distance travelled. This process is repeated as long as the brake is applied. The calculated differences are representative of deviation of the actual deceleration profile from the ideal profile.

The BOP then causes the pointer 17 of the dashboard display to deflect upwards if the actual vehicle speed is lower than that of the ideal deceleration profile for the distance travelled, to signal to the driver that too high a braking effort has been deployed, or to deflect downwards in the event that the speed is too high for the distance travelled to indicate that too low a braking effort has been deployed.

In one arrangement the pointer moves in proportion to the amount the speed differs from the ideal speed for a given distance travelled. In another arrangement the BOP determines zones either side of the ideal profile, as shown in FIGS. 5 and 6, and then determines into which zone the measured braking manoeuvre falls. The pointer is then caused to point to a segment corresponding to that zone. An output from the BOP as to braking performance such as this may also be used to drive other types of display.

During braking the BOP also causes the ACTUAL digital display to display the instantaneous amount of power being recovered to the battery, obtained from the regenerative brake controller 8, and the TARGET digital display to display the amount of power which would be recovered if the stored ideal deceleration profile were followed.

The BOP could provide feedback to the driver in other ways. In yet another embodiment output from the BOP is used to modify behaviour of the mechanical brake booster 11, or otherwise, to change brake pedal feel. Where the driver's braking is heavier than required to achieve the ideal deceleration profile the brake pedal can be stiffened and vice-versa where the driver's braking is too light. Changes in brake pedal feel may only be temporary, and/or may be easily overridden by a driver, so as not to compromise vehicle safety.

When the brake pedal is released by the driver the BOP stops calculating the difference between actual and theoretical automobile speed, returns the pointer 17 on the display to the mid position and ceases to display any information on the digital displays 18.

At the completion of a braking manoeuvre the BOP also stores information relating to the manoeuvre. This includes:
  speed at which brake pedal pressed
  speed at which brake pedal released
  deceleration profile for the manoeuvre
  energy recovered
and may further include any or all of the following:
  distance travelled during manoeuvre
  location where the manoeuvre took place (obtained from the navigation unit)
  characteristics of the road where the manoeuvre took place
  time of day when manoeuvre took place
  ambient temperature at which the manoeuvre took place This information may be used to update the ideal deceleration profile stored by the BOP against which the efficiency of braking manoeuvres are assessed. The enables an ideal deceleration profile to be established which reflects the actual, real world performance of the automobile. Consequently guidance given to the driver will more accurately reflect the actual performance of the vehicle and so be more useful and achievable.

In one embodiment, where the amount of energy recovered during a braking manoeuvre over the same speed range as the stored ideal deceleration profile with which it was compared exceeds that recovered (or recoverable) by following the ideal deceleration profile the deceleration profile of the braking manoeuvre is stored as the ideal deceleration profile, replacing the original ideal deceleration profile.

In a more complex example, multiple ideal deceleration profiles are stored for different driving conditions and a braking manoeuvre is compared to the ideal deceleration profile which relates to conditions which most closely replicate the actual conditions in which the manoeuvre is performed. In this case each stored profile is the best known profile for the driving conditions to which it relates, i.e. that which achieves the greatest energy recovery in these conditions.

For example, where details of ideal deceleration profiles are stored with reference to a location, when a manoeuvre is commenced the BOP determines the location using data from the navigation system and selects the stored ideal deceleration profile obtained closest to that location. If ideal deceleration profiles are also stored with reference to the time of day at which they were obtained an ideal deceleration profile with which to compare a current braking manoeuvre can be selected additionally on the basis of the time of day of the current braking manoeuvre. So of those ideal deceleration profiles obtained at the closest location(s) to a current braking manoeuvre the BOP can select the one obtained at the same or closest time to the current manoeuvre. Time of day is a good predictor of traffic conditions. Selecting previous events recorded at a similar time of day makes it more likely that the previous event was conducted during similar conditions to the current event.

Similarly where details of ideal deceleration profiles are stored in relation to ambient temperature the current ambient temperature at which a braking manoeuvre can be measured and the manoeuvre compared with an appropriate ideal manoeuvre carried out at the same or closest ambient temperature. This allows guidance offered to a driver to take account of changes in performance of the regenerative braking system with temperature, as well as how braking manoeuvres are affected by temperature.

Where characteristics of the road where a braking manoeuvre took place are stored with details of a braking manoeuvre, the BOP may rely upon stored data of ideal previous braking manoeuvres conducted on a road with the same or similar characteristics as the road on which a current manoeuvre is being made, against which to measure efficiency of a current manoeuvre. This is useful where no (or limited) previous data is recorded for braking events at that location. For example, information stored relating to braking manoeuvres conducted on steep downhill gradients may be used to measure efficiency of a braking manoeuvre conducted on a similarly steep downhill gradient conducted at a different location.

The BOP is thus configured to learn by expanding the number of ideal deceleration profiles against which future braking manoeuvres can be compared in order to provide driver feedback. The BOP will, on brake application, select the ideal deceleration profile which was obtained in conditions (which may be spatial, temporal and/or environmental) which best fit those of the current braking manoeuvre. In practice drivers routinely repeat journeys, often at the same times, so a useful library of ideal deceleration profiles will be quickly established.

However, in many circumstances a braking manoeuvre will take place in conditions in which there is no realistically comparable ideal deceleration profile stored by the BOP. In this case selecting the stored ideal deceleration profile obtained in conditions that most closely match those of the current braking manoeuvre will not provide a realistic or useful comparison. To address this, in embodiments of the system the BOP is provided with a theoretical ideal default deceleration profile.

When a first real world braking manoeuvre takes place this is compared with the default, but it is also stored along with details of the time, location, temperature and any other conditions relative to the manoeuvre to form an additional ideal deceleration profile. Future braking manoeuvres are then compared with the stored real world example where there is a sufficiently close match between the conditions of the manoeuvre and those of the stored profile, and otherwise compared with the default deceleration profile and saved as an additional ideal deceleration profile.

For future braking manoeuvres, when the manoeuvre is commenced, the BOP determines if it should be compared against those of a previously stored real world deceleration profile and thus replace that deceleration profile only in the event that better energy recovery is obtained, or against the default deceleration profile and then stored as an additional ideal deceleration profile.

First it is necessary to determine if there any stored deceleration profiles that can be used as a valid comparison. This necessitates comparing the temporal, spatial and/or environmental data of a current deceleration profile with that of stored ideal profiles to determine if one or more parameters are sufficiently close to one another to warrant comparison. A similarity threshold is set for each parameter to be considered. For example, it may be appropriate only to compare deceleration profiles obtained within a given distance of the same location, and of these only those obtained within a given time of the current time of day.

Where this process identifies more than one deceleration profile which presents a valid comparison with a current braking manoeuvre the BOP then selects the most relevant profile with which to make the comparison. This is achieved by determining a similarity score obtained by comparing how close recorded parameters are to each other and applying appropriate weightings to each parameter. For example it may be decided that location, gradient, time of day and day of the week are more important in determining that two manoeuvres are comparable than, say, ambient temperature.

The current manoeuvre is then compared with the ideal deceleration profile with which it has the highest similarity score.

Where the initial screening process to find comparable deceleration profiles does not identify any profiles, or where the similarity score of a selected profile does not exceed a certain threshold, the current manoeuvre is compared with the default deceleration profile and then stored as an additional ideal deceleration against which future manoeuvres can be compared.

The above embodiments are described by way of example only. Many variations are possible without departing from the scope of the invention as defined in the appended claims.

The invention claimed is:

1. A regenerative braking system for a vehicle comprising:
a memory storing details of one or more deceleration profiles for the vehicle, the or each deceleration profile comprising a record that includes at least one indication of vehicle speed at a respective point in time;
a processor arranged to compare a current braking manoeuvre with the stored one or more deceleration profiles and generate an output signal, during the manoeuvre, representative of any deviation of the deceleration profile of the current braking manoeuvre from the stored one or more deceleration profiles with which it is compared; and a driver interface driven by the output signal in order to provide feedback to a driver of the vehicle on the current braking manoeuvre, during the braking manoeuvre; and
a memory storing the deceleration profile of the current braking manoeuvre and wherein the processor is arranged, on completion of a braking manoeuvre, to determine a merit score for the deceleration profile of the current manoeuvre and to compare this with the merit score of the stored braking profile with which the current braking profile was compared during the braking manoeuvre,
wherein the processor is arranged to replace details of the deceleration profile of the stored one or more deceleration profiles with details of the deceleration profile of the current braking manoeuvre when the merit score of the deceleration profile of the current braking manoeuvre exceeds that of the deceleration profile of the stored braking manoeuvre, thus replacing the stored one or more deceleration profiles.

2. A regenerative braking system for a vehicle as claimed in claim 1 wherein the driver interface indicates if the driver's braking effort is lower or higher than that required to achieve the stored one or more deceleration profiles.

3. A regenerative braking system as claimed in claim 1 wherein, the merit score of a braking manoeuvre is, or relates to, the amount of energy recovered during the braking manoeuvre.

4. A regenerative braking system as claimed in claim 1 comprising a regenerative brake controller arranged to provide information about braking events to the processor, the information including at least one of the following:
vehicle speed;
the duration of brake application:
the demanded braking effort;
braking effort provided by the regenerative braking system; and
energy recovered by the regenerative braking system.

5. A regenerative braking system as claimed in claim 1 comprising a positioning system operative to determine the location of the vehicle, and provide this to the processor.

6. A regenerative braking system as claimed in claim 5 wherein the positioning system comprises a memory storing map data and is arranged to provide information relating to characteristics of the road at the vehicle's location to the processor.

7. A regenerative braking system as claimed in claim 1 wherein the processor comprises a clock enabling the time of a braking manoeuvre to be determined.

8. A regenerative braking system as claimed in claim 1 comprising a thermometer operative to measure the ambient temperature outside the vehicle and provide it to the processor.

9. A regenerative braking system as claimed in claim 1 comprising a sensor operative to provide information relating to the distance travelled by the vehicle to the processor.

10. A regenerative braking system as claimed in claim 1 arranged to store the following details of deceleration profiles:
distance travelled per unit time;
demanded braking effort; and
energy recovered.

11. A regenerative braking system as claimed in claim 10 arranged to store at least one of the following details of deceleration profiles:
location;
time of day;
day of the week;
characteristics of the road; and
temperature.

12. A regenerative braking system as claimed in claim 1 wherein the memory stores details of at least two deceleration profiles and the processor is arranged, when a brake application is initially made, to select one of the stored deceleration profiles against which to compare the current braking manoeuvre.

13. A regenerative braking system as claimed in claim 12 wherein the processor is arranged to compare at least one of spatial, temporal and environmental information stored in relation to the stored one or more deceleration profiles with the corresponding information pertaining to the current braking manoeuvre and to select the stored deceleration profile for which the stored environmental information most closely matches that of the current braking manoeuvre.

14. A regenerative braking system as claimed in claim 12 wherein:
one of the two or more deceleration profiles stored is designated as a default deceleration profile;
the memory stores details of the default deceleration profile and details of at least one additional deceleration profile and the details of the additional deceleration profile includes at least one of spatial, temporal, and environmental information;
the processor is arranged to compare at least one of the spatial, temporal, and environmental information stored in relation to the additional stored deceleration profiles with the corresponding information pertaining to the current braking manoeuvre and select any profiles with which a comparison can be made and, in default of any profiles being selected, to compare the current braking manoeuvre with the default deceleration profile.

15. A regenerative braking system as claimed in claim 14 wherein, when more than one deceleration profile with which a comparison can be made is selected, the means for comparing is arranged to generate a similarity score representing the degree of similarity between at least one of the spatial, temporal and environmental information of the current braking manoeuvre and that of each of the stored one or more deceleration profiles.

16. A regenerative braking system as claimed in claim 15 wherein the processor is arranged to select the deceleration profile with the highest similarity score to compare with the current braking manoeuvre, provided that the similarity score exceeds a threshold value, and otherwise to compare it with the default deceleration profile.

17. A regenerative braking system as claimed in claim 14 wherein, when the current braking manoeuvre is compared with the default deceleration profile, the processor is arranged to store details of the deceleration profile of the current braking manoeuvre as an additional deceleration profile.

18. A regenerative braking system for a vehicle comprising: a memory storing details of a deceleration profile for the vehicle, the or each deceleration profile comprising a record of vehicle speed over time or equivalent; a processor arranged to compare a current braking manoeuvre with the stored deceleration profile and generate an output signal, during the manoeuvre, representative of any deviation of the deceleration profile of the current braking manoeuvre from the one or more stored deceleration profiles with which it is compared; and further comprising a memory for storing the deceleration profile of the current braking manoeuvre, wherein the processor is further arranged, on completion of a braking manoeuvre, to determine a merit score for the deceleration profile of the current manoeuvre, to compare this with the merit score of the stored braking profile with which the current braking profile was compared during the braking manoeuvre and to replace details of the deceleration profile of the stored one or more deceleration profiles with details of the deceleration profile of the current braking manoeuvre when the merit score of the deceleration profile of the current braking manoeuvre exceeds that of the deceleration profile of the stored braking manoeuvre.

* * * * *